United States Patent [19]

Blum

[11] 4,369,490
[45] Jan. 18, 1983

[54] LOW-RIPPLE POWER RECTIFIER SYSTEM
[75] Inventor: Frithjof Blum, Munich, Fed. Rep. of Germany
[73] Assignee: Patent-Treuhand-Gesellschaft Für Elektrische Gluhlampen, Munich, Fed. Rep. of Germany
[21] Appl. No.: 212,118
[22] Filed: Dec. 2, 1980
[30] Foreign Application Priority Data
  Dec. 14, 1979 [DE] Fed. Rep. of Germany ....... 2950411
[51] Int. Cl.³ ........................................... H02M 1/14
[52] U.S. Cl. ..................................... 363/48; 323/208; 363/126
[58] Field of Search ............................ 363/37, 44–48, 363/114, 126; 323/208; 315/205

[56] References Cited
U.S. PATENT DOCUMENTS

| 3,978,388 | 8/1976 | de Vries | 363/45 |
| 4,127,893 | 11/1978 | Goepel | 363/37 |
| 4,188,661 | 2/1980 | Bower et al. | 363/37 |
| 4,222,096 | 9/1980 | Capewell | 363/44 |

FOREIGN PATENT DOCUMENTS

| 473276 | 10/1937 | United Kingdom | 363/114 |
| 770896 | 3/1957 | United Kingdom | 363/47 |
| 418849 | 9/1974 | U.S.S.R. | 363/48 |

Primary Examiner—William H. Beha, Jr.
Attorney, Agent, or Firm—Frishauf, Holtz, Goodman & Woodward

[57] ABSTRACT

To provide a power rectifier for connection to an a-c power network which has low ripple at the d-c output, and low harmonic content at the a-c side, particularly for feeding a d-c - a-c inverter frequency generator providing output in the audio or low supersonic range for supply of gas discharge or fluorescent lamps, a wave-shaping network is connected to the a-c side of a standard bridge rectifier unit such that the a-c power applied to the rectifier is of approximately trapezoidal or rectangular or square-wave shape; a suitable network is the combination of an inductance (D) and a storage capacitor(C1) in a T-network or in a series resonant circuit, in which the quadrature VA of the choke (D), at network frequency, is about 60% of the power to be supplied by the rectifier, with a capacitor (C1) in a T-network configuration of such value that the resonant frequency of the L/C circuit is about 2.2 to 2.6 times network frequency or equal to network frequency, when in a series resonant circuit. Splitting the inductance (D) into two winding portions, one in each one of the supply lines substantially reduces radio interference from a connected gas discharge lamp.

13 Claims, 17 Drawing Figures

LOW-RIPPLE POWER RECTIFIER SYSTEM

The present invention relates to a power rectifier system adapted for connection to commercial power networks and providing direct current with particularly smooth output wave shape, that is, having low-ripple content, especially adapted to feed semiconductor circuits, for example to supply power to discharge lamps at a frequency for which the lamps are particularly adapted.

Background and Prior Art

Most d-c power utilization apparatus is fed from customary a-c networks through a rectifier system. Single-phase a-c power, when rectified through the usual single-phase push-pull rectifiers, has an output voltage with a pulsation of 100%, that is, the instantaneous voltage changes at double-line or network frequency between zero and maximum value. Many apparatus cannot operate with such a high ripple. If the apparatus includes semiconductor circuitry, and especially d-c operated gas discharge lamps, losses may become excessive. Acceptable ripple is usually below 20%. Power electronic circuits should have as low a ripple as possible in order to decrease losses in transistors and other power semiconductors. High-pressure discharge lamps which are operated from a power source which includes a rectifier connected to a-c mains have substantially decreased lifetime when the ripple of the supplied d-c increases.

Various arrangements and circuits are known to decrease ripple in rectified a-c, which can be used singly or in combination. Use of multi-phase, for example three-phase or six-phase rectifiers permit a much lower ripple content; smoothing capacitors, inductors such as chokes and the like, are also used. For example, a three-phase rectifier in bridge circuit provides an output voltage which has a ripple of only 13.4% without, even, any external smoothing capacitor. Single-phase full-wave or push-pull rectifiers usually utilize additional apparatus by connecting, behind the rectifier, a filter capacitor or a combination of filter capacitor, a charge capacitor, and a choke. The voltage derived from a three-phase bridge rectifier with 13.4% ripple can also be additionally smoothed by capacitors, inductors, and the like, in order to further decrease the ripple.

Both arrangements have disadvantages. Three-phase current frequently is not available, particularly not for lighting circuits, which would also require three-phase switching and the like. Single-phase rectifiers, thus, must be used in combination with lighting circuits, although the base ripple is 100%. Smoothing, then, in order to eliminate ripple is done by means of filter capacitors of high-capacity value. As the ripple decreases, the phase angle of current flow decreases, and the peak current value at the a-c side increases. As a consequence, the wave shape of the supplied current is distorted with a high harmonic content, resulting in low efficiency and lower power factor of the network.

General service illumination by means of discharge lamps operated at a frequency other than power network frequency, for example in the low ultrasonic range, requires a solution to the provision of d-c power at low ripple from commercial a-c networks. Fluorescent lamps operating, for example at about 20 kHz, provide about up to 10% more light output than similar lamps connected to the network directly, and operated at network frequency, for example 60 Hz. Thus, a commercially and technically suitable solution for supply of low-ripple d-c is desirable in order to permit operation of such lamps at elevated frequencies, for example in the low supersonic range, in order to improve the light output of the lamps without increasing the input power.

Frequency generating circuits operating in the low supersonic range, for example 20 kHz and having low ripple, have, in the past, used known standard full-wave rectifiers with connected filtering circuits. These rectifiers have the disadvantages above referred to; in addition to their inherent disadvantages, combination of such circuits with the frequency generators results in radio interference emission which increases as the quality of filtering increases.

Currently electronic apparatus are not rated for their reaction on the power network to which they may be connected; thus, there are, currently, no limiting conditions associated with electronic apparatus with respect to generation of harmonics which occur in the power network, nor with respect to power factor. Upon installation of such apparatus in large numbers, however, it is only logical to assume that the power network suppliers, in combination with governmental and technical regulatory and standardization organizations, such as the National Bureau of Standards, Federal Power Commission, International Electrotechnical Commission (IEC) and the like, will set limits for ripple or harmonics which are fed back into the network, and which will provide for a minimum power factor of connected load also for general service illumination apparatus, just as such standards and limits are set for other power utilizing appliances and apparatus adapted to be connected to a power network.

The Invention

It is an object to provide a d-c rectifier system, particularly for use with power networks, to provide d-c output with minimum ripple which, with a minimum of expensive components, reflects harmonics to the power network within acceptable limits and has a power factor of 0.9 or better. Limits of harmonics are determined, for example, in accordance with IEC standards and, for example, German standard VDE 0712. The apparatus should be specifically suitable for supplying frequency generators of the audible or ultrasonic range in combination with discharge lamps. Preferably, radio noise interference generated by the lamps and/or the circuits connected thereto should, additionally, be suppressed, or at least highly damped.

Briefly, in accordance with the invention, an a-c wave shaping or wave transforming network is connected at the a-c side to the rectifier which converts the received a-c sinusoidal wave shape to a wave shape which is approximately trapeze-shaped or rectangular. The circuit components for the network, preferably, are a combination of a storage inductance and a storage capacitor, dimensioned and matched with respect to each other to have a resonant frequency equal to, or greater than network frequency, but less than three times network frequency; the tuning frequency of the network thus provides for required wave shaping.

In the specification and claims herein, the term "trapezoidal wave shape" is deemed to include the special situation when the angles of the trapeze are right angles, so that, in effect, the wave shape is then essentially a square wave or rectangular wave. The term "trapezoidal wave shape" will be used to include the special situation to avoid repetition in wording.

Placing an inductance/capacitance circuit combination ahead of the rectifier results in an output which has low ripple; for transformation of the network voltage, the transformer will receive a voltage having relatively steep flanks, so that the phase angle of current flow in the network is substantially increased, resulting in a decrease of harmonics in the power network and simultaneous improvement in the power factor to values in excess of 0.9.

Two basic circuits have been found eminently suitable. Both circuits use a storage inductance or choke connected in series with the input of the rectifier which, preferably, is a full-wave rectifier, and in case of three-phase networks, a bridge rectifier. The storage capacitor can be differently placed. The capacity value of the capacitor is matched to that of the impedance of the choke at network frquency.

In one of the circuit arrangements, the storage capacitor is connected in parallel to the input to the rectifier. The storage capacitor and the choke or inductance then form a T-circuit. This circuit results in the desired decrease of harmonics in the power system, that is, the harmonics are within the limits determined by IEC and other standards, while increasing the network power factor to about 0.94.

The second circuit arrangement uses a series circuit of a choke and a capacitor, forming a series or tuned circuit. This series circuit results in sufficient decrease of harmonics in the network and an increase in the power factor to about 0.9, or just slightly below, with a phase shift in the inductive direction. In order to improve this circuit, a correction capacitor can be connected in parallel to the input of the rectifier. The correction capacitor improves the power factor substantially to about 0.95 and results in a further decrease of harmonics in the power-network.

Circuits have been proposed in which the choke or inductance and the storage capacitor are arranged in a parallel resonant circuit. It has been found that such a simple parallel resonant circuit does not permit obtaining the low level of harmonics in the power network required by governmental and industry standards. The parallel resonant circuit does decrease the intensity of the harmonics to which it is tuned, for example the third harmonic, but does not suppress other harmonics, particularly the higher-number harmonics which can pass without, essentially, any damping. In order to be able to obtain d-c output of low ripple, without introducing harmonics into the supply power network, it would be necessary to connect a plurality of parallel resonant circuits to the power supply network, tuned to different harmonic frequencies, which would result in an expensive and complex construction of the rectifier system, which then no longer would be economically feasible. While technologically possible, the costs of such a system would be excessive.

Arranging a choke or storage inductance and a storage capacitor as a T-circuit, or, alternatively, as a series resonant circuit, results in an economical rectifier system which furnishes the required characteristics. The respective elements can be readily determined by simple well known calculations and optimum effectiveness and economical use of components can be readily determined emperically, in the light of existing price levels for the component elements involved.

Electronic accessory equipment to operate discharge lamps, such as fluorescent lamps, results in radio interference which increases with decrease of losses in the accessory equipment itself. Thus, the higher the quality of the accessory equipment, the fewer the losses, and hence greater radio interference. Radio interference can be suppressed by the rectifier system, for example by separating the storage inductance in two paths which each are connected in one of the supply lines to the rectifier itself. This results in substantial decrease of radio interference which is radiated as well as interference which is transmitted over the power lines to which the rectifier system is connected. Subdividing the storage inductance can be done in various ways, for example by placing two windings, each forming a half winding of the inductance on a single core, or to use two separate inductances, each of about half the inductivity, or the reactive impedance of the total inductance required. Using two separate inductances provides for better radio interference suppression, at a higher cost, however, than when a single core is used on which two windings are wound, It is known that three-phase rectifiers of customary construction result in generation of substantial harmonic content in the network and pass any radio interfence signals generated in the utilization apparatus essentially without any damping. The circuit described for a low-ripple, low-harmonic, single-phase rectifer so constructed that radio interference is a minimum can also be applied to a three-phase rectifier, particularly a three-phase bridge rectifier—effectively a six-phase rectifier. The design criteria are the same as those for a single-phase rectifier.

DRAWINGS

Figure 3:
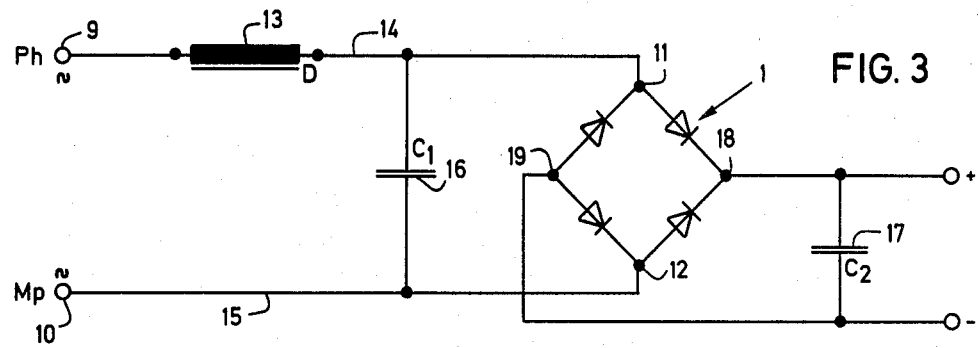
FIG. 3 is the basic circuit of a power rectifier in accordance with the present invention, connected to a single-phase network having low-power phase harmonics.
Figure 4A:
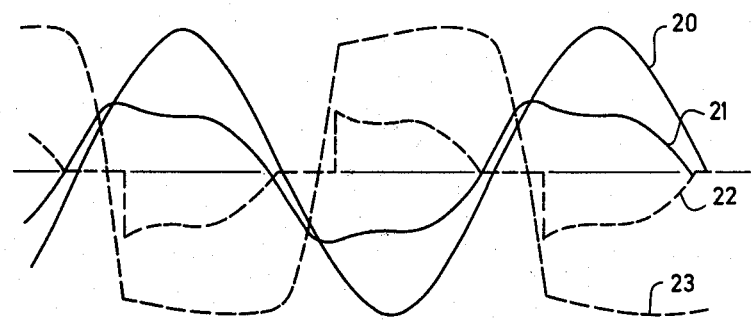
Figure 4B:
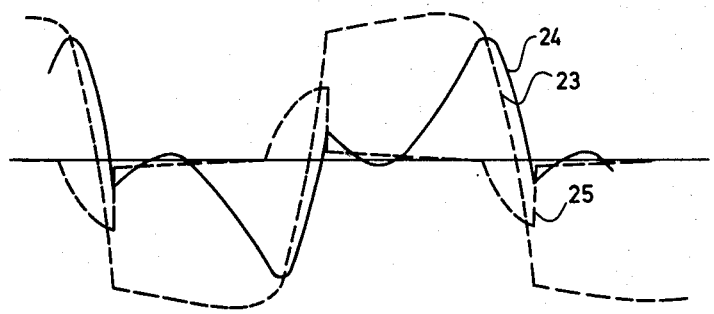
Figure 5:
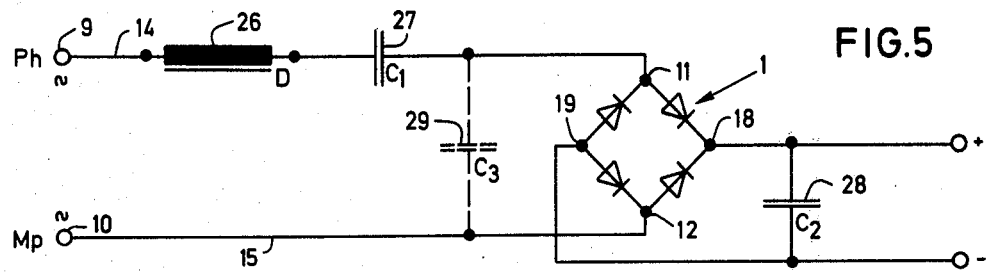
Figure 6A:
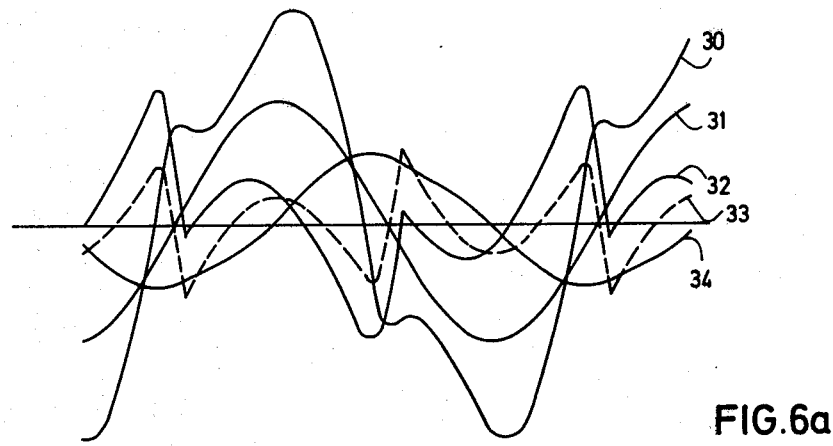
Figure 6B:
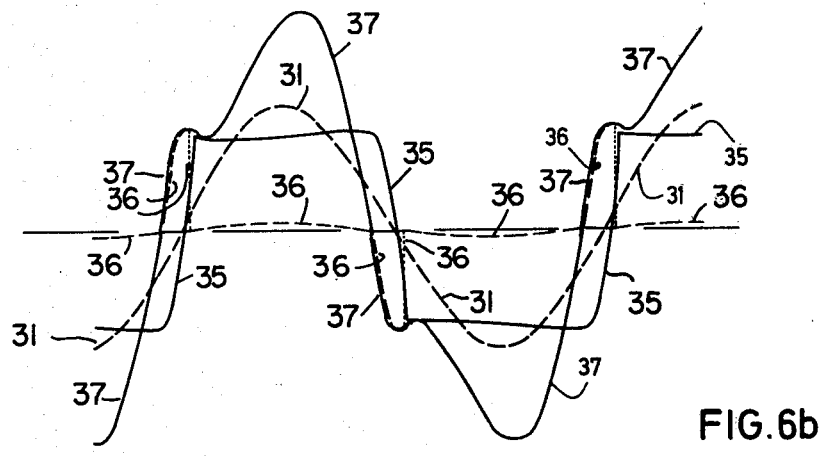
Figure 7A:
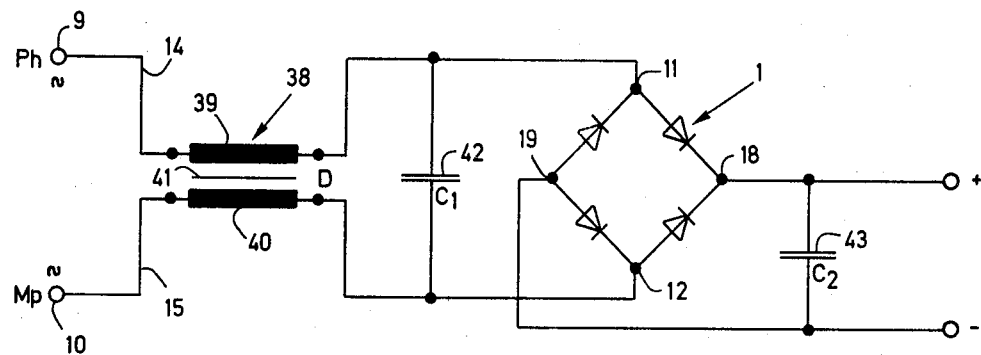
Figure 7B:
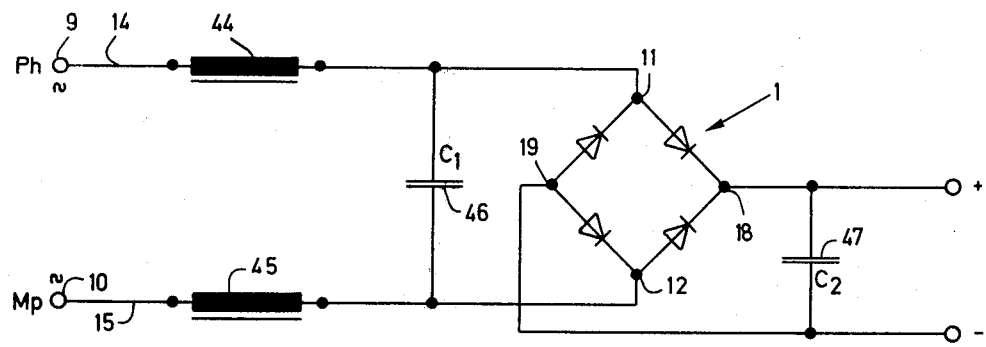
Figure 8A:
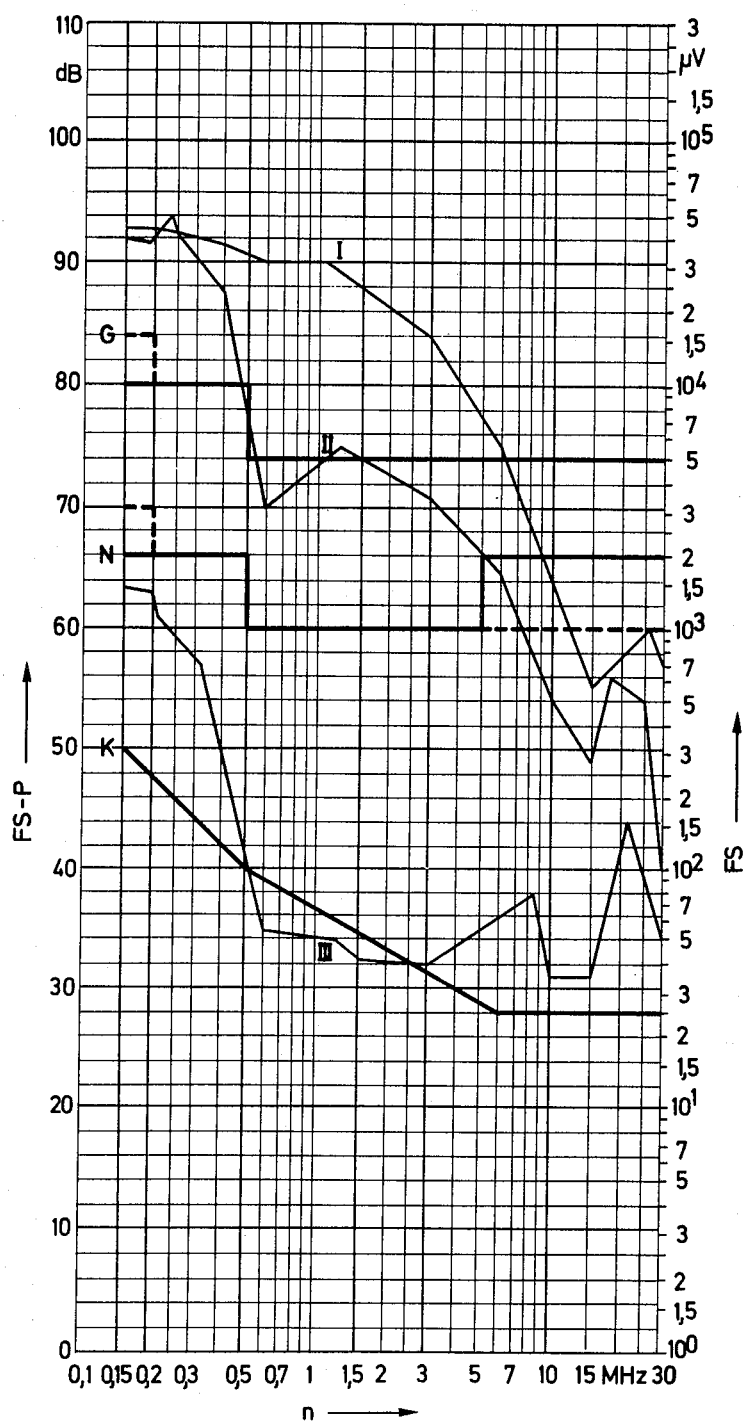
Figure 8B:
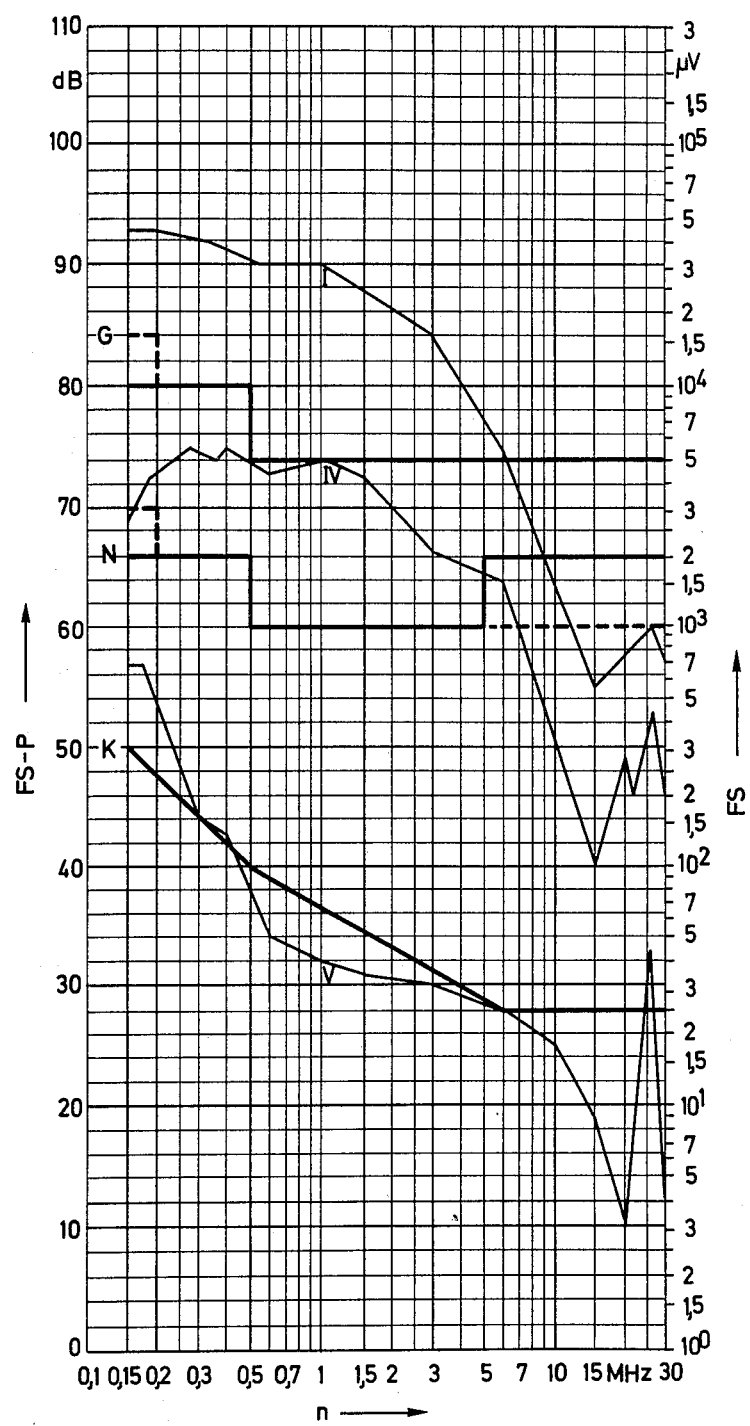
Figure 9A:
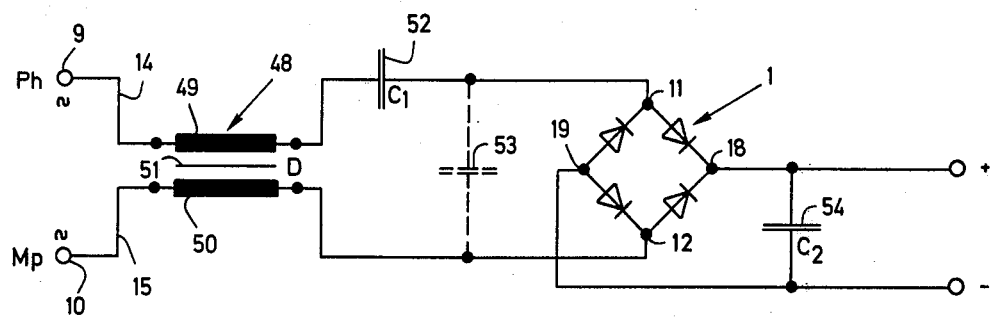
Figure 9B:
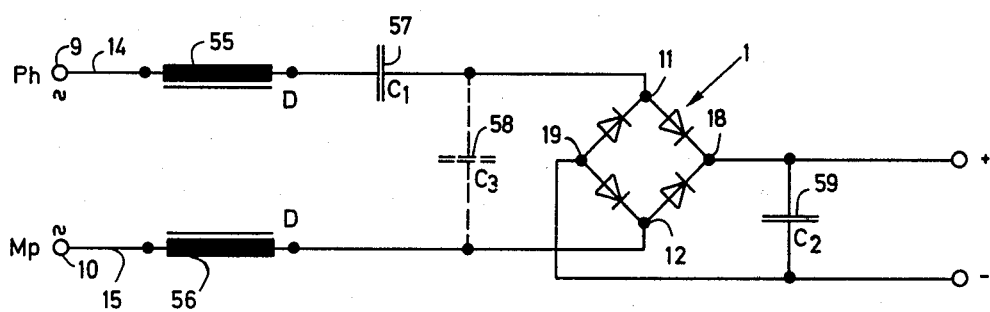
Figure 10:
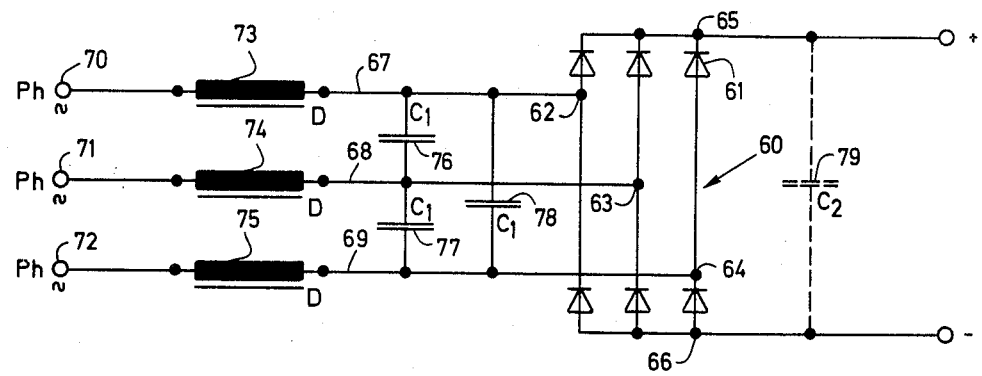
Figure 11:
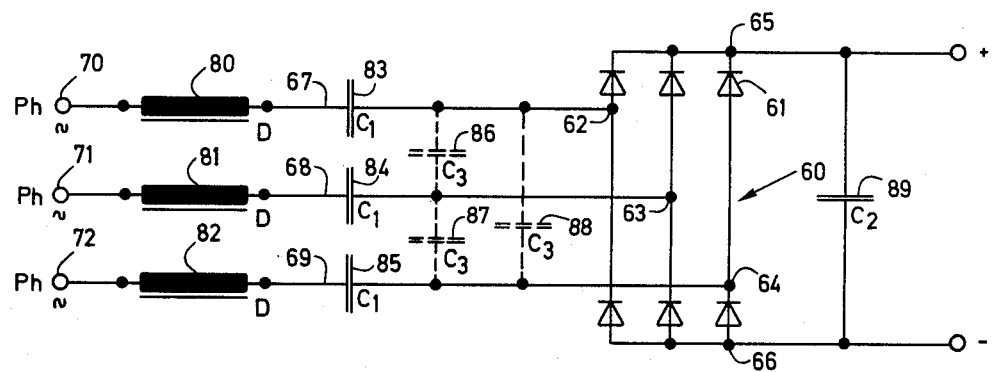

FIGS. 4a and 4b, drawn in vertical alignment, are timing diagrams of voltage and currents of a rectifier in accordance with FIG. 3;

FIG. 5 is a single-phase power rectifier with harmonic suppression circuitry in series resonant arrangement;

FIGS. 6a and 6b, drawn in vertical alignment, are voltage and current diagrams of the rectifier in accordance with FIG. 5;

FIGS. 7a and 7b are two embodiments of rectifier systems for single-phase application with radio noise interference damping circuitry;

FIGS. 8a and 8b are diagrams illustrating radio noise interference suppression of the circuits in FIGS. 7a, 7b, respectively;

FIGS. 9a and 9b are two different embodiments of single-phase circuits with radio noise interference suppression using series resonant circuits;

FIG. 10 is a circuit diagram of a rectifier arrangement of three-phase full-wave rectification with a T-network; and FIG. 11 is a three-phase rectifier arrangement with series resonant circuits.

Figure 1A:
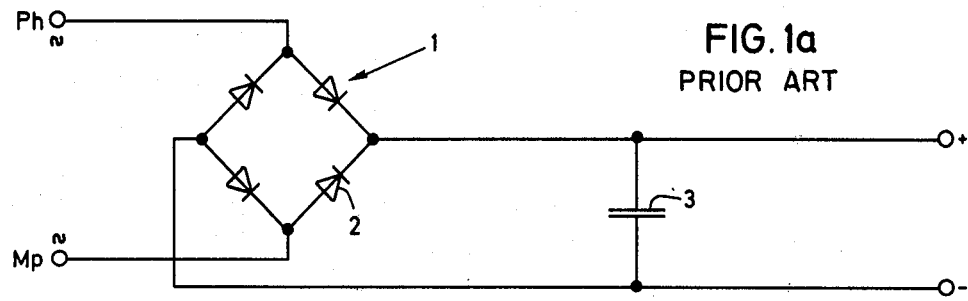
FIGS. 1a and 1b are rectifier circuits in accordance with the prior art, of standard construction, which will be referred to for comparision purposes.
Figure 1B:
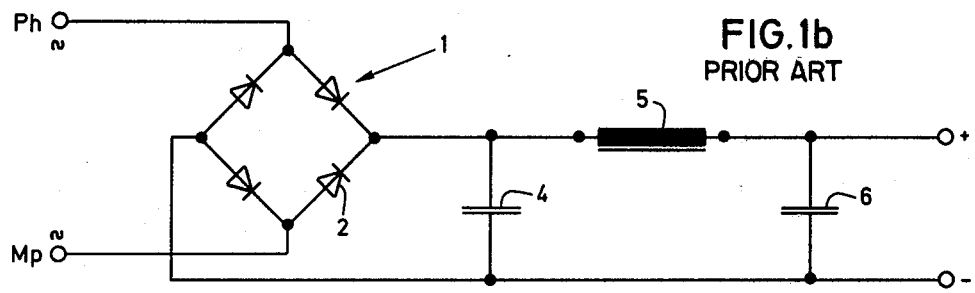

A single-phase full-wave rectifier as shown in FIGS. 1a, 1b is connected as well known and in accordance with prior art, by connecting behind the rectifier bridge unit 1 a smoothing or filtering capacitor 3. The rectifier array or unit 1 consists of separate rectifier diode elements which, preferably, are solidstate semiconductor rectifiers but need not be; they can be valve types. In its simplest form, the d-c output has filter capacitor 3 (FIG. 1a) connected thereto; better output smoothing is obtained by using the combination of a charge capacitor 4, an inductance in form of a throttle or choke 5, and a further filter capacitor 6 (see FIG. 1b). This basic circuit can be readily adapted for use with three-phase, and three-phase rectified power can be smoothed by the circuits of FIG. 1a or 1b as well known.

Figure 2:
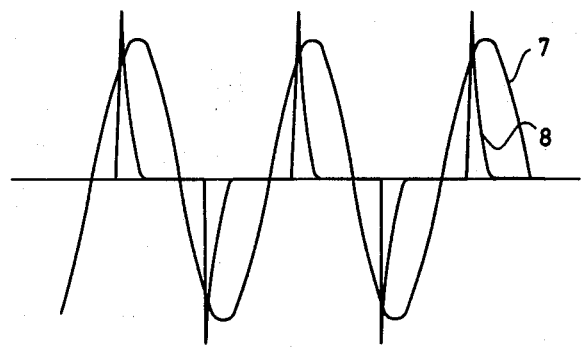
FIG. 2 is a timing diagram of network voltage and current at the a-c side upon connection of a rectifier in accordance with FIG. 1a or 1b.

The time-voltage and current diagram is shown in FIG. 2, which shows the network voltage 7 and the network current 8 of either one of the rectifiers of FIG. 1a or 1b. The particular rectifier of either of FIG. 1a or 1b can be constructed to have an actual power output of 135 W, for example, for supply electrical power to a semiconductor circuit for operation of gas discharge lamps, such as fluorescent lamps, in the low ultrasonic range, for example about 20 kHz. The d-c ripple is reduced by the capacitor 3, or the combination of capacitor 4, 6 and inductance 5, to about 16%; the power factor is 0.56, and the network current, curve 8, due to the very short phase angle of current flow of only about 44 electrical degrees (°-el) is rich in harmonics. The third harmonic is 88%, the fifth harmonic 65%, the seventh harmonic 38%, etc. (with reference to the fundamental wave). A three-phase rectifier, without further smoothing at the d-c side, will only have a current phase angle flow of about 60°-el, which, with additional smoothing capacitors, is further decreased. Thus, it has similar disadvantages as a single-phase rectifier, although in a somewhat less degree. FIG. 2 shows the voltage and current waves.

In accordance with the present invention, a waveshaping network is connected in advance of the rectifier, to provide output of low ripple, with high power factor and low harmonic content at the a-c side.

FIG. 3 illustrates a single-phase full-wave rectifier with a-c terminals 9, 10 connected to input terminals 11, 12 of the rectifier array 1. Between the terminals 9, 10 of the a-c network line and the rectifier array inputs 11, 12, a choke D, or inductance 13, is connected, suitably dimensioned to carry the current to be supplied by the rectifier in dependence on the d-c load placed thereon. The choke D is connected in the "hot" or phase terminal Ph, that is, in line 14. A storage capacitor C1, reference numeral 16, is connected across the input terminals 11, 12 of the rectifier unit 1. The capacity value of capacitor C1 is matched to the impedance of the choke D. The circuit, thus, is a T-circuit. The d-c side of the rectifier 1 has a filter capacitor C2, reference numeral 17, connected thereacross. The capacity of filter capacitor C2 can be much less than that of capacitor 3 (FIG. 1a) for a similar ripple at the output than it would be if the circuit D/C1 were omitted at the a-c side of the rectifier. The filter capacitor 17 is connected, as customary, across the output terminals 18, 19 of the rectifier 1. The second a-c terminal 12 of the rectifier 1 is connected through the "ground" line 15 to the ground or common terminal Mp of the a-c network.

The circuit of FIG. 3 has been constructed in one exemplary form for use with fluorescent lamps and a frequency generator circuit generating a frequency for lamp operation in the low supersonic range with a power input thereto of 135 W. The circuit of FIG. 3 was so designed that the harmonics in the power circuit would not exceed the values set by the IEC and which meet the standards of German electrical standard VDE 0712, part 2. Typical impedance values, for a single-phase network of 50 Hz, are as follows:

EXAMPLE 1

| | |
|---|---|
| Impedance (50 Hz) of inductance D | $Z = 163\ \Omega$ |
| apparent power of inductance D | $P_S = 90\ VA$ |
| storage capacitor C1 | $C = 3.4\ \mu F$ |
| filter capacitor C2 | $C = 40\ \mu F$ |
| network voltage | $U_N = 220\ V$ |
| network current | $I_N = 0.74\ A$ |
| network power factor | $\lambda_N = 0.94$ |
| third harmonic of network current | $3.H = 20\%$ |
| fifth harmonic of network current | $5.H = 6\%$ |
| seventh harmonic of network current | $7.H = 2\%$ |
| total further odd harmonics | $H_T =$ less than 1% |
| d-c ripple | $p = 12\%$ |
| lamp power | $P_L = 135\ W$ |
| overall accessory losses | $P_{V\Sigma} = 15\ W.$ |

The harmonics of the network current are all well within acceptable limits. The network power factor could be raised to the high value of 0.94. The losses of the accessory, due to the low ripple, were lowered by about 3 W over those of FIG. 1a, thus largely compensating the losses which are caused by the voltage drops through the inductance D, so that the overall accessory losses were only 15 W, providing for an overall operating efficiency of 90%.

Oscillograms of current and voltage relationships of the circuit of FIG. 3, in operation, are shown in FIGS. 4a and 4b. The oscillograms have been broken up into two aligned figures for clarity. The incoming network voltage is shown at 20—FIG. 4a. The network current is shown at 21. The current taken up by the rectifiers is shown at the broken-line curve 22 and the voltage across the storage capacitor C1 by the broken-line curve 23. FIG. 4b, in vertical alignment, again shows the voltage across the storage capacitor C1, curve 24, in solid line, shows the voltage across the inductance D, and broken-line curve 25 shows the current through the storage capacitor C1.

It will be seen that the network D/C1 provides for wave shaping of the voltage applied to the rectifier unit 1—see curve 23—into approximately trapezoidal shape, in which, it is to be remembered, the term "trapezoidal" is independent of the angular relationship of a trapeze.

Embodiment of FIG. 5: The combination of inductance D and capacity C1 can be realized not only in the T-arrangement of FIG. 3 but, also, in a series resonance circuit as seen in FIG. 5. This arrangement provides a low harmonic network rectifier with low ripple output. Similar elements have been given similar reference numerals; functionally equivalent elements have been given the same letter designation, although, in the circuit, they may be somewhat differently positioned and thus have been given different reference numeral designation.

Network terminals 9, 10 are connected to the terminals 11, 12 of rectifier unit 1. Serially connected between the terminals 9, 10 and one of the terminals 11, 12, is a series resonance circuit formed by the inductance D 26 and the storage capacitor C1 27, the capacity of which is matched to that of the choke D. The d-c side of the rectifier 1 is connected to filter capacitor C2 28, the capacity of which, just as in the example of FIG. 3, can be substantially smaller than if no circuit at the a-c side were placed. The circuit can be further improved, both with respect to harmonics in the a-c line as well as with respect to power factor, by connecting a further correction capacitor C3 29 between the output of the series resonance circuit D/C1 and the rectifier inputs, that is, across the input terminals 11, 12 of the rectifier.

A circuit in accordance with FIG. 5, and specifically designed for supersonic frequency operation of a power rectifier was constructed with the following values:

EXAMPLE 2

| | |
|---|---|
| Impedance of choke D (50 Hz) | $Z = 166\ \Omega$ |
| apparent power, choke D | $P_S = 90$ VA |
| storage capacitor C1 | $C = 19.2\ \mu F$ |
| filter capacitor C2 | $C = 45\ \mu F$ |
| correction capacitor C3 | $C = 0.95\ \mu F$ |
| network voltage | $U_N = 220$ V |
| network current | $I_N = 720$ mA |
| overall power | $P_G = 150$ W |
| lamp power | $P_L = 135$ W |
| network power factor | $\lambda_N = 0.95$ |
| d-c ripple | $p = 12\%$ |
| third harmonic of network current | $3.H = 23\%$ |
| fifth harmonic of network current | $5.H = 5.8\%$ |
| seventh harmonic of network current | $7.H = 3.1\%$ |
| ninth harmonic of network current | $9.H = 1.6\%$ |
| total further odd harmonics | $H_T{}' =$ less than 1%. |

The harmonics in the a-c network are similar to those of the embodiment of FIG. 3, that is, the T-circuit. Likewise, the overall losses are about 15 W. The power factor is somewhat better, 0.95 as against 0.94. The choke D can be the same for both embodiments; the storage capacitor C1 likewise can be the same and the apparent power likewise is similar. The values of the capacitors, however, are different. In the embodiment of the FIG. 3, the storage capacitor C1 must be designed—in a 220 V line voltage system—for 310 V with a capacitor of 3.4 μF. In the circuit of FIG. 5, the capacity is 19.2 μF, with an operating voltage of 115 V. The correction capacitor C3 is an additional element, thus making the overall circuit somewhat more costly. It is not entirely necessary, however, and thus is shown in broken lines. It does, however, result in marked improvement of the rectifier system, and particularly better power factor, which otherwise would require a larger inductance choke.

The primary difference between the circuits of FIGS. 3 and 5 is this: The circuit of FIG. 3, with the T-configuration, provides a d-c voltage of between 300 to 320 V (with 220 V input); the circuit with the series resonance arrangement of FIG. 5 provides between 225-235 V with 220 V input. For many applications, the rectifier arrangement as illustrated in FIG. 3 is preferable.

Operating oscillograms of the rectifier system of FIG. 5 are shown in FIGS. 6a, 6b again in aligned arrangement, and broken up for ease of analysis. Curve 30 shows the network current, curve 31 the sinusoidal network voltage. Curve 32 is the voltage across the inductance choke D alone, the broken-line curve 33 is the voltage across the choke D and the storage capacitor C1. Curve 34 shows the voltage across the storage capacitor C1. The supply voltage curve 31 is reproduced, in broken lines, in FIG. 6b which further shows, in curve 35, the voltage across the correction capacitor C3. Curve 36 is the current through the correction capacitor C3. The a-c taken by the rectifier elements is shown at curve 37. It is seen, again, that the supply voltage to the rectifier part, which corresponds to the voltage across capacitor C3, is close to a rectangular or square-wave voltage, that is, is right angle—trapezoidal, see curve 35, FIG. 6b.

Electronic apparatus operating at a frequency substantially in excess of power frequency, for example in the audio, high-audio or supersonic range, which is particularly adapted to operate fluorescent lamps, for example, causes radio inteference. The circuit can be used to additionally suppress radiated, as well as line-propagated radio interference. Reference is made to FIGS. 7a and 7b:

Embodiment of FIG. 7a: The system corresponds, basically, to that of FIG. 3. The inductance D, generally shown at 38, has two separate windings 39, 40 wound on a common core 41. Capacitor C1,42 is connected across the input terminals 11, 12 of the rectifier. A filter capacitor C2,43 bridges the output terminal 18, 19.

Embodiment of FIG. 7b: The basic system is similar, except that the inductance D is now separated into two separate chokes 44, 45, each having half the inductance or apparent power of the inductance 13 (FIG. 3) or 38 (FIG. 7a). The storage capacitor C1,46, and the filter capacitor C2, 47 are placed as in FIG. 7a.

Operating diagrams, with reference to FIGS. 8a and 8b: FIGS. 8a and 8b show radio interference voltages Fs or, respectively, radio interference levels Fs-P at the ordinate, in dependence on frequency (n) at the abscissa for an electronic accessory unit, loaded with fluorescent discharge lamps of 135 W power. Network voltage is 220 V at 50 Hz, the accessory circuit has circuit losses of 15 W. Operating frequency for a lamp load—not shown—connected through an inverter circuit to the output terminals marked + and −, that is, the cross terminals 18, 19 provides for operation at 25 kHz.

Curves I to V are entered in the usual diagram customary for data sheets of radio interference measurements, in which only the graphic portion is shown in FIGS. 8a, 8b.

Curve I, in both figures, illustrates interference voltages upon feeding a lamp inverter and the lamps with a rectifier of the prior art, for example of the type shown in FIG. 1a or 1b; curves II and IV interference voltages by use of rectifiers in accordance with the present invention, in which curve II in FIG. 8a illustrates the arrangement in accordance with FIG. 7a, in which the choke D has a subdivided winding. Curve IV, FIG. 8b, shows the arrangement of the circuit of FIG. 7b, in which the choke D is subdivided into two separate parts 44, 45. The storage capacitor C1, in each case, has a capacity of 3.4 μF.

Curves III and V, respectively, show the interference voltage with an additional noise suppression circuit applied thereto, in accordance with regulations and applicable standards. The noise suppression unit which was connected to the lamps, used as loads, with respect to curve III of FIG. 8a was a pi-network with capacitors of 0.03 μF and 2×2500 pF and 2×4 mH. Curve III has the circuit of FIG. 7a. Curve V had the circuit of FIG. 7b with an additional noise suppression circuit of a similar network with 0.03 μF+2×2500 pF+2×1 mH inductance. It is to be noted that the noise suppression circuits required for noise suppression of a lamp load connected to the rectifier circuit of FIG. 7b can be substantially smaller, due to the much smaller inductance than that for the circuit of FIG. 7a, curve III. The lines G, N, K in the data sheets of the FIGS. 8a, 8b represent the three limits of the radio interference voltage in accordance with the VDE 0875 standard.

G="Grob" (high admissible interference level)
N="Normal" (normal admissible interference level)
K="Klein" (low admissible interference level).

The existing standard is given by the solid lines; the broken lines show the desired standard curves for the limits G and N of the radio interference voltage.

Embodiment of FIG. 9: FIGS. 9a and 9b illustrate circuit arrangements with radio interference noise suppression utilizing the basic circuit of FIG. 5, that is, a series resonance circuit, in combination with a single-phase supply.

FIG. 9a illustrates a choke D, 48 having two separate windings 49, 50 on a common core 51, the windings 49, 50 being respectively connected serially in the network supply lines 14, 15. Storage capacitor C1, 52 is serially connected with the choke 48, in series with the winding 49. An additional phase correction capacitor C3, 53 can be connected across the input terminals 11, 12 of the rectifier, but is not strictly necessary. The filter capacitor C2, 54 is arranged as is customary.

FIG. 9b illustrates the inductance D in form of two separate chokes 55, 56, each of half the inductivity, and apparent power, respectively. The storage capacitor C1, 57, a possible phase correction capicator C3, 58, and filter capacitor C2, 59 are connected as shown, and similar to FIG. 9a.

The curves for noise suppression shown in FIGS. 8a and 8b are essentially similar to those for the rectifier systems of FIGS. 7a, 7b, respectively, and the better noise suppression of the circuit of FIG. 9b also is similar to that in connection with the circuit of FIG. 7b.

The concept of the present application can be equally applied to multi-phase networks. FIGS. 10, 11 show, respectively, the basic circuits of FIGS. 3, 5 applied to three-phase networks.

Embodiment of FIG. 10: A customary bridge-type rectifier 60 has rectifier valves 61 connected as well known, and as shown in the drawing. The rectifier 60 has three inputs 62, 63, 64 and two d-c outputs 65, 66. In accordance with FIG. 10, each one of the three-phase network supply lines 67, 68, 69, connected to respective phase terminals 70, 71, 72, has a choke D 73, 74, 75 serially connected thereto. Any two rectifier inputs are bridged by a storage capacitor C1 76, 77, 78, as shown, so that the basic circuit arrangement corresponds to T-circuits. Since such a three-phase rectifier already has comparatively low ripple at the output terminals 65, 66, the further filter capacitor C2, 79 is not strictly necessary and, therefore, has been shown in broken lines. Use of the capacitor C2, however, further decreases the output ripple.

Embodiment of FIG. 11: FIG. 11 shows a series resonant circuit in the a-c lines—corresponding to the series resonant circuit of FIG. 5. Inductances D 80, 81, 82 are connected as in FIG. 10; the storage capacitor C1, in form of capacitors 83, 84, 85, is serially connected with the respective inductances 80, 82, 82 so that each one of the supply lines 67, 68, 69 has the series connection of a choke 80 and a storage capactor 83 serially connected therein. Additional phase correction capacitors C3 86, 87, 88 can be used, if desired, and connected as shown in broken lines, since they are not strictly necessary. The filter capacitor C2, 89 is preferably used, but not strictly necessary.

Constructional criteria for building the rectifier systems, particularly for supply of frequency generators to in turn supply gas discharge lamps, are subject to these considerations: The T-circuit of FIG. 3, as well as the series resonance circuit of FIG. 5, requires storage inductances D which should be so dimensioned that the third harmonic in the a-c supply current is limited to, at the most, 25% of maximum, with an overall power factor of at least 0.9. Since the magnetic energy must supply power when the network voltage, instantaneously, is small and supply this power—in accordance with permitted output ripple—it is necessary that the reactive power, or apparent power, be directly proportional to the actual power supplied by the rectifier. Considering weight, cost, and $I^2R$ losses, the inductance D should have as low an apparent power as possible. It has been determined empirically that a choke or inductance D, having an apparent power—at network frequency—of about 60% of the actual power supplied is capable of holding the harmonic content of the a-c network at a sufficiently low level and additionally insures, in connection with a comparatively small filter capacitor C2, that the ripple at the d-c output of the rectifier will not be more than 15%, and actually can be somewhere between 10% and 15%. The dimensioning of the inductance choke D further should consider that its characteristic at rated voltage is approximately linear up to rated current. If the characteristic is curved—for example due to excessive saturation—the third harmonic will be enhanced. Thus, the core content of the choke element should be sufficient to provide for an essentially straight-line characteristic up to rated current.

The storage capacitor C1 has to be dimensioned differently for the circuit of FIG. 3, with a T-circuit, or for a series resonant circuit, FIG. 5. In the circuit of FIG. 3, the capacity of the capacitor C1 is determined by the consideration that, for a 50 Hz network, the resonant frequency of the choke D in combination with the capacitor C1 should be less than the third harmonic, i.e., 150 Hz and greater than 100 Hz (for 60 Hz, between 180 and 120 Hz). A suitable value is an intermediate resonant frequency of 120 Hz (150 Hz for 60 Hz networks). Good results can be obtained in a range varying about 10 Hz from the optimum in either direction. If the higher frequency is exceeded, for example above 130 Hz (160 Hz for a 60 Hz network), then the third harmonic of the a-c will undesirably increase; if the lower limit is passed, the unit will receive an excess capacitative quadrature current component, and the overall efficiency decreases.

The foregoing has been determined in connection with 50 Hz and 60 Hz networks; for other network frequencies, the values change correspondingly. In a preferred form, the resonant frequency of the inductance/capacitance network of the system of FIG. 3, formed by the inductance D and the capacitor C1, is preferably in the range of about 2.2 to 2.6 of network frequency; the best results have been found at about 2.4 times network frequency.

The capacity of the storage capacitor C1, when used in the series resonant circuit of FIG. 5, is determined in combination with the inductance of the choke D so that the resonant frequency will conform to network frequency. Any deviation of the resonant frequency from network frequency results in increasing harmonics in the network current. The necessary operating voltage or peak dielectric of the storage capacitor C1 for a 220 V network is in the order of about 115–120 V.

The phase correction capacitor C3, when using the series resonant circuit of FIG. 5, has been determined empirically, in which a balance has been struck between the best possible technical effect and the economics of the overall circuit. Such a suitable balance can be obtained when the capacity of the capacitor C3 is about 5% of the capacity of the storage capacitor C1. The operating voltage, for a 220 V network, of course, would be 220 V at least.

The filter capacitor C2 at the d-c output of the rectifier can be made substantially smaller than such filter capacitors of the prior art, with the same final output ripple. Thus, filter capacitor C2 can be designed for maximum permitted ripple. Using the rectifier arrangement with the T-circuit, FIG. 3, requires a filter capacitor C2 which has a capacity of about 0.3 $\mu$F per watt of the effective or actual output power. This value is suitable for rectifiers with a supply voltage of 220 V nominal and a network frequency of 50 Hz. The capacity changes inversely with the square of the voltage for other voltages and inversely linearly with the frequency, so that, for 110 V, 60 hz, a capacity of about 1.0 $\mu$F/W would be suitable. The capacity of the capacitor C2 is not critical and can readily be varies within a wide range and, effectively, affects only the final ripple of the d-c output. The harmonics in the a-c network, the power factor, and the actual power, are hardly influenced by the value of the capacity of capacitor C2. Reducing the capacity to half, for example 0.15 $\mu$F/W (at 220 V, 50 Hz) or 0.5 $\mu$F/W (at 110 V, 60 Hz, respectively), still permits operation with operating parameters within applicable limits and operating standards for electrical equipment.

The value of the filter capacitor C2, when using the series resonant circuit of FIG. 5, requires a slightly higher capacity for best effects, for example in the order of about 0.5 $\mu$F, per watt of output power at 220 V, and, as in the above example, assuming a network frequency of 50 Hz. Again, upon different voltage operation, the optimum capacity of the filter capacitor C2 changes inversely with the square of the voltage and inversely linearly with the frequency, so that for 110 V, 60 Hz a capacity of about 1.7 $\mu$F/W would be suitable. The capacity of the filter capacitor, as in the embodiment of FIG. 3, itself, is not critical and may vary within wide limits. Increasing the capacity decreases the ripple; decreasing the capacity, conversely, increases the ripple. For optimum results, a balance between costs and permitted ripple can readily be determined.

The above-described dimensioning relations are particularly suitable for rectifiers adapted for connection to a power network which provides a low-ripple d-c output with minimum harmonics in the a-c network, and especially for operation of fluorescent lamps from a d-c audio or supersonic range frequency generator-inverter from the d-c output. The particular dimensions referred to permit economical manufacture of such units. If the requirements regarding freedom from harmonics in the a-c network are raised, or the degree of ripple in the d-c circuit should be particularly low, then, at some cost, the circuit still permits such adaptation. For example, it is possible to so arrange the circuit that the sum of all the harmonics in the a-c network will be below 3%, and/or the ripple in the d-c portion will be below 3%. To decrease further the harmonic content in the a-c network, it is only necessary to use a choke D which is larger, and has a higher impedance; the capacity of the storage capacitor C1 then has to be decreased to the extent that the resonant frequency of the T-circuit (FIG. 3) is in the range of between 2.2 to 2.6 of network frequency. If a series resonant circuit is used (FIG. 5), then of course the resonant frequency thereof must be equal to the network frequency. This also maintains high power factor. To decrease ripple at the output, the increase in the choke D will then have the desired effect if, additionally, a filter capacitor C2 of higher capacity is used. The larger choke D permits such greater use. The best results are obtained when the corresponding conditions for resonant frequency between the choke D and the storage capacitor C1 are met, while, additionally, the capacity of the filter capacitor C2 is increased over that given for optimum economic application.

Various changes and modifications may be made, and features described in connection with any one of the embodiments may be used with any of the others, within the scope of the inventive concept.

I claim:

1. Low-ripple low-harmonic reflecting rectifier system, particularly for coupling to an a-c power network and to receive a-c power input, and to provide d-c power output to a d-c semiconductor circuit, especially to supply a discharge lamp inverter circuit from a-c power terminals (Ph, Mp; 9, 10), having
   a-c network terminals;
   a rectifier circuit (1), having an input and an output;
   a filter capacitor (C2) connected across the d-c output of the rectifier circuit;
   and comprising, in accordance with the invention,
   an a-c wave-shaping and wave-transforming network means (D; C1) connected to receive the a-c voltage from the power network in sinusoidal wave shape and converting said sinusoidal wave shape to a wave shape which is approximately of trapezoidal shape including
   the combination of storage inductance means (D), and a storage capacitor (C1) connected to the a-c network terminals,
   the storage inductance (D) being connected between the network terminals and the input to the rectifier circuit in serial connected, and the storage capacitor (C1) being connected in parallel across the input to the rectifier circuit,
   and dimensioned and matched with respect to each other and the frequency of the voltage supplied by the a-c network in sinusoidal wave shape, to have a resonant frequency greater than twice network frequency but less than three times network frequency.

2. Rectifier system according to claim 1, wherein (FIGS. 3, 5) the network is a single-phase network having two network terminals, and the storage inductance is connected in the "hot" or ungrounded or phase line of said network.

3. Rectifier system according to claim 1, wherein (FIGS. 7a, 7b; 9a, 9b) the network is a single-phase network, and the storage inductance (D) comprises two inductance units, one each being connected in one of the supply lines of the single-phase network.

4. Rectifier system according to claim 3, wherein (FIGS. 7a, 9a) the inductance units comprise a common core and two separate inductance windings would on said core, one winding, each, being connected in one of said supply lines of the network.

5. Rectifier system according to claim 3, wherein (FIGS. 7b, 9b) the inductance units comprise separate cores and separate inductance windings wound on the respectively separate cores and connected in the respective supply lines.

6. Rectifier system according to claim 1, wherein (FIGS. 10, 11) the network is a three-phase network having at least three connecting lines, in which the storage inductance (D) comprises a separate inductance unit (73, 74, 75; 80, 81, 82) connected in respective supply lines of the three-phase network.

7. Rectifier system according to claim 1, wherein (FIG. 10) the rectifier circuit is a bridge rectifier circuit having three input terminals (62, 63, 64);
and wherein the storage capacitor (C1) comprises three capacitor units (76, 77, 78) connected, each, across two respectively different input terminals of the rectifier circuit.

8. Rectifier system according to claim 1, wherein the resonant frequency of the storage inductance (D) and the storage capacitor (C1) combination is between about 2.2 to 2.6 times network frequency.

9. Rectifier system according to claim 1, wherein the impedance of the inductance (D) at network frequency is selected to have an apparent power of about 60% of the actual effective power to be supplied by said system.

10. Rectifier system according to claim 1, wherein the capacity of the filter capacitor (C2) is in the order of at least 0.15 $\mu$F/watt of the power to be supplied by the rectifier circuit at a supply voltage of 220 V nominal and a network frequency of 50 Hz.

11. Rectifier system according to claim 10, wherein the capacity of the filter capacitor (C2) is in the order of about 0.3 $\mu$F/watt of power supplied by the system.

12. Rectifier system according to claim 1, wherein the capacity of the filter capacitor (C2) is in the order of at least 0.5 $\mu$F/watt of the power supplied by the rectifier circuit at a supply voltage of 110 V nominal and a network frequency of 60 Hz.

13. Rectifier system according to claim 12, wherein the capacity of the filter capacitor (C2) is in the order of about 1.0 $\mu$F/watt of power supplied by the system.

* * * * *